US005237394A

United States Patent [19]

Eaton

[11] Patent Number: 5,237,394

[45] Date of Patent: Aug. 17, 1993

[54] METHOD AND APPARATUS FOR PRINT VERIFICATION

[75] Inventor: Richard B. Eaton, Rochester, N.Y.

[73] Assignee: Xerox Corporation, Stamford, Conn.

[21] Appl. No.: 969,533

[22] Filed: Oct. 30, 1992

Related U.S. Application Data

[63] Continuation of Ser. No. 712,762, Jun. 10, 1991, abandoned.

[51] Int. Cl.[5] .......... G01N 21/27

[52] U.S. Cl. .......... 356/402; 101/181; 101/76; 283/70

[58] Field of Search .......... 101/181, 76, 73-75, 101/180, 183; 283/70; 73/865.9; 356/402, 403, 409, 410, 411

[56] References Cited

U.S. PATENT DOCUMENTS

| | | | |
|---|---|---|---|
| 3,342,997 | 9/1967 | Taylor et al. | 356/409 X |
| 4,165,465 | 8/1979 | Kanatani et al. | 101/181 X |
| 4,534,288 | 8/1985 | Brouman | 101/181 |
| 4,546,700 | 10/1985 | Kishner et al. | 101/181 |
| 4,645,240 | 2/1987 | Whitehead et al. | 283/74 |
| 4,733,887 | 3/1988 | Mowry, Jr. | 283/58 |
| 4,798,136 | 1/1989 | Tittgemeyer et al. | 101/181 |
| 5,056,430 | 10/1991 | Bayerlein et al. | 101/181 |
| 5,080,399 | 1/1992 | Olson | 283/70 |
| 5,138,667 | 8/1992 | Roch et al. | 101/181 X |

FOREIGN PATENT DOCUMENTS

| | | | |
|---|---|---|---|
| 1243422 | 6/1967 | Fed. Rep. of Germany | 356/402 |
| 2000816 | 7/1971 | Fed. Rep. of Germany | 356/402 |
| 3332750 | 4/1985 | Fed. Rep. of Germany | 356/402 |
| 196430 | 11/1984 | Japan | 356/402 |
| 284745 | 11/1989 | Japan | 356/402 |
| 2064113 | 6/1981 | United Kingdom | 356/402 |

*Primary Examiner*—Tom Noland
*Attorney, Agent, or Firm*—Oliff & Berridge

[57] ABSTRACT

A print verification method and apparatus verifies the integrity of information printed on a document. The information to be verified is printed on a document in a first color. Desired information is printed on the document in a second color which is different from the first color. The desired information is printed directly above the information printed in the first color. It is detected whether any of the information printed in the first color is exposed following printing of the desired information in the second color. If any of the information printed in the first color is detected to be exposed, an indication is made that improper printing has occurred. If, however, no information printed in the first color is exposed following printing of the desired information in the second color, it is verified that proper printing has occurred.

14 Claims, 2 Drawing Sheets

METHOD AND APPARATUS FOR PRINT VERIFICATION

This is a continuation of application Ser. No. 07/712,762 filed Jun. 10, 1991, now abandoned.

BACKGROUND OF THE INVENTION

1. Field of the Invention

The present invention relates to a method and apparatus for print verification and, more particularly, to a method and apparatus for verifying that printed number sequencing on documents is correct.

2. Description of the Related Art

A common printing application involves printing on pre-printed, sequentially numbered forms. Examples of this type of printing include check printing, insurance policies, receipts, etc. The sequential numbering on these forms is particularly important since the number information is often used to guarantee traceability, facilitate record keeping, etc. In applications such as check printing, it is crucial that each individual document be readily identifiable and the correct number is printed in a proper location. Accordingly, it is desirable to quickly and easily verify that the printed information is properly associated with the printed form.

U.S. Pat. No. 4,645,240 to Whitehead et al discloses numbered documents, each of which has a unique identifying number. In order to prevent unauthorized duplication of the documents, at least two characters in the identifying number differ from one another in at least one visible characteristic such as size.

U.S Pat. No. 4,733,887 to Mowry Jr. discloses a method of preparing secure financial documents in which a major amount, such as dollar amount, is printed in a white on black pattern, while a minor amount, such as a cents amount, is printed in a black on white pattern. The printing patterns are used in order that any alteration of the document is difficult.

While the related art references disclose manners in which documents can be produced to prevent unauthorized alteration, the references fail to disclose any manner in which the printed material on the documents can be verified. Accordingly, there still exists a need for a method and apparatus for print verification which quickly and easily enables verification of the printed material on the documents.

OBJECTS AND SUMMARY OF THE INVENTION

An object of the present invention is to provide a method and apparatus which facilitates verification of printed information on documents.

Another object of the present invention is to provide a method and apparatus for verifying printed information which does not consume an excessive amount of time.

A further object of the present invention is to provide a method and apparatus for verifying printed information which does not significantly increase the costs associated with the printing process.

To achieve the foregoing and another objects and to overcome the shortcomings discussed above, a method and apparatus for verifying printed information on documents is provided. The pre-printed information is printed in a first color at a desired location on the document. Thereafter, the desired information is printed at the same location in a second color which is different from the first color such that the printed information in the second color overlies the printed information in the first color. If any of the information printed in the first color is left exposed and is not covered by the information printed in the second color, it is determined that improper printing has occurred.

BRIEF DESCRIPTION OF THE DRAWINGS

The invention will be described in detail with reference to the following drawings wherein.

DETAILED DESCRIPTION OF THE PREFERRED EMBODIMENT

Figure 1:
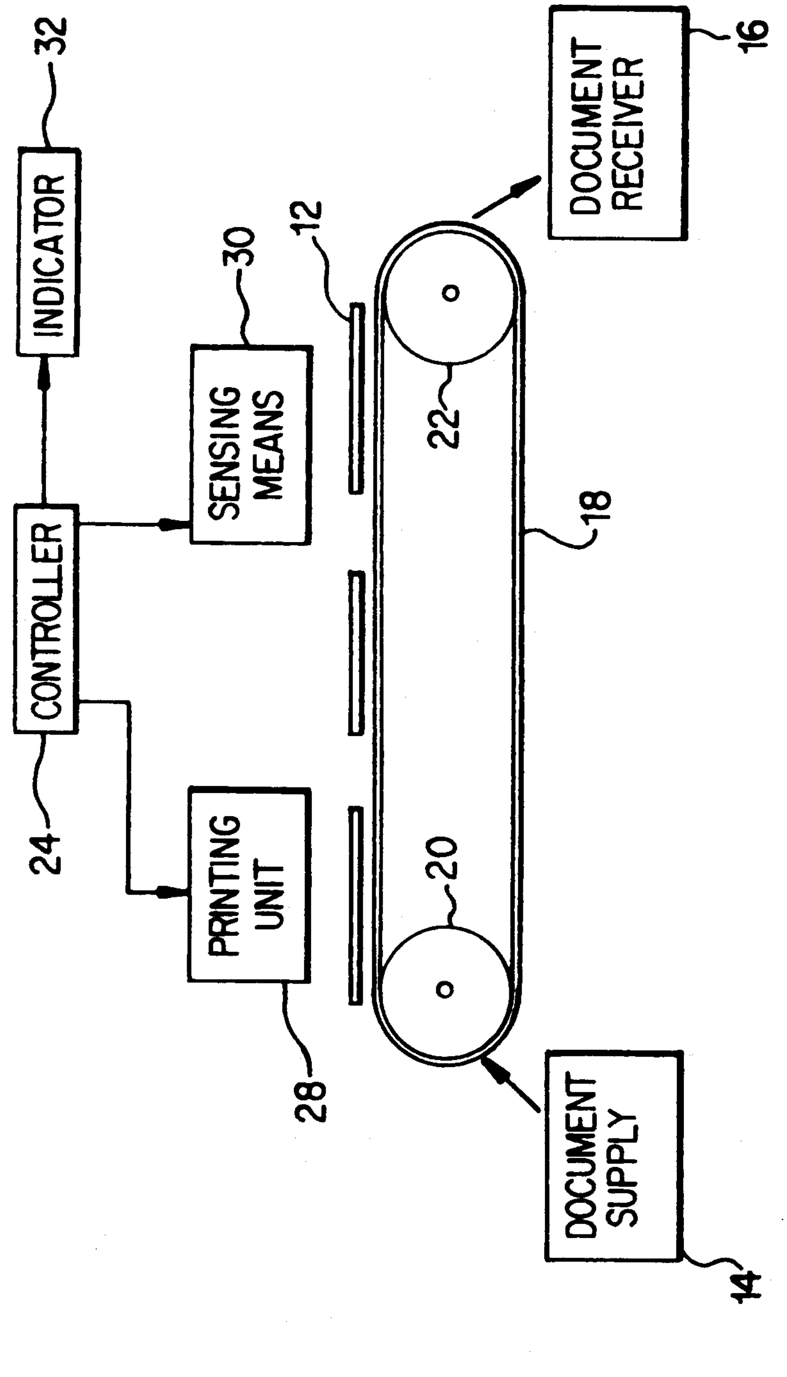
FIG. 1 is a block diagram of an apparatus used for printing verification.

Referring now to the drawings, and particularly to FIG. 1 thereof, an apparatus 10 for verifying printed information on documents is illustrated. Apparatus 10 includes a supply 14 which supplies documents 12 having information printed thereon and a receiver 16 for receiving the documents. The information printed on documents 12, such as number information, is printed in a first color. The documents 12 are located on a belt 18 which travels around, for example, spaced rollers 20 and 22. As the documents 12 are provided to belt 18 from supply 14, belt 18 travels to provide each document 12 in confronting relationship with a printing unit 28.

Printing unit 28 operates to print desired information, such as sequential numbers, on each document 12. Printing unit 28 prints the desired information in a second color which is different from the color of the preprinted information provided on the sheets in supply 14. The desired information which is printed in the second color corresponds to the information, e.g., the particular numbers, that should have been printed in the first color. The desired information is further printed in the particular location where the information in the first color should have been printed. Printing unit 28 prints the information in the second color such that the information overlies the information printed in the first color. Printing unit 28 prints the desired information in a font, size, etc. corresponding to that of the pre-printed information. Documents 12 then travel past printing unit 28 to a sensing means 30.

Sensing means 30 can comprise, for example, a photosensitive light sensing means which transmits light to a specified location of said document where the information is printed, the photosensitive light sensing means then receiving the light reflected by the documents. Sensing means 30 detects whether any of the information printed in the first color remains exposed after printing unit 28 prints the information in the second color. If any of the information printed in the first color does remain exposed, an indication can be made by indicator 32 that the information printed in the first color on the particular document has been improperly printed. The indication can, for example, be audible or visual.

A controller 24 controls operation of the printing unit 28, sensing means 30 and indicator 32. Controller 24 further controls the rotational movement of rollers 20 and 22 to control the delivery of the documents to the printing unit 28 and sensing means 30. Controller 24 thus controls apparatus 10 such that, as rollers 20 and 22 operate to move belt 18 to deliver the documents 12 in confronting relationship with printing unit 28 and sensing means 30, the printing unit 28 and the sensing means 30 will be selectively operated to print information in the proper location on each document 12 and to sense exposure of the information printed in the first color at the proper location.

Once it has been determined that the information printed in the first color is not exposed, apparatus 10 provides verification that the documents supplied from supply 14 have been properly printed. In contrast, if improper printing of the information in the first color is sensed, the particular improperly printed document or an entire set of documents can be discarded and proper printing can subsequently be performed.

Figure 2:
FIG. 2 shows a pre-printed number printed in a first color according to the present invention.

FIG. 2 illustrates an example of printed information on a document supplied from supply 14. This information is printed in a first color, in this example, gray.

Figure 3:
FIG. 3 shows a properly printed number following printing in a second color by a printing unit according to the present invention.

FIG. 3 illustrates an example of properly printed information provided on a document 12 after the information has been printed in the second color, in this example, black. As shown in FIG. 3, the information printed in the first color is entirely covered by the information printed in the second color, thus leaving no exposed portions of the information printed in the first color. This information is thus determined to have been properly printed.

Figure 4:
FIG. 4 shows a printing discrepancy detected after printing in the,, second color by the printing unit of the present invention.

FIG. 4, in contrast, illustrates an example of information which was improperly pre-printed. The information printed in the first color (i.e., 34) and the information printed in the second color (i.e., 36) are different. Accordingly, when the information is printed in the second color over the information printed in the first color, portions of the information printed in the first color (i.e., portions of the 4) remain exposed. It is thus determined that improper printing of the information in the first color has been performed. The printing can thus be corrected.

Figure 5:
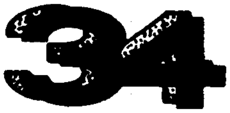
FIG. 5 s an alternate printing discrepancy detected following printing in the second color by the printing unit of the present invention.

FIG. 5 illustrates another example of improperly printed information. While the information printed in the second color (black) is the same information printed in the first color (gray), portions of the information printed in the first color remain exposed due to mis-registration during the process of printing in the first color. In certain applications, for example, check printing, it is necessary to print the information in an exact position. Accordingly, mis-registration during the printing process can be detected by the method and apparatus of the present invention.

The present invention thus provides a simple and efficient manner to verify the integrity of information printed on documents. Accordingly, document printing can be reliably performed without consuming extraordinary amounts of time and materials.

While the invention has been described in conjunction with a specific embodiment, it is readily apparent that various embodiments can be used to verify the integrity of the printed information. For example, various sensing means can be used to detect exposure of the information printed in the first color. A light emitter could be provided on one side of the document and a light detector could be provided on an opposite side of the document to detect light transmitted through, not reflected by the document. The print controller 24, printing unit 28, sensing means 30 and indicator 32 could be provided in conjunction with a printer which prints the information in the first color to reduce the time necessary for the printing and verification operations. The indicator can comprise a visual or audible indicator. Alternatively, the presence of improperly printed documents can be determined in other manners. For example, a plurality of document receivers could be provided such that one document receiver receives properly printed documents while a separate document receiver receives improperly printed documents. While the printing of numbers has been disclosed, any type of printed information can be verified using the method and apparatus of the present invention. While printing in different colors has been disclosed, printing can be performed in different shades of one color.

It is thus evident that many alternatives, modifications and verifications will be apparent to those skilled in the art. Accordingly, the preferred embodiment of the invention as set forth herein is intended to be illustrative, not limiting. Various changes may be made without departing from the spirit and scope of the invention as defined in the following claims.

What is claimed is:

1. A print verification method comprising:

providing a document having desired complete information printed thereon in a first color; and verifying that said printed information in said first color has been properly printed, said verifying including:

printing desired information on the document in a second color, which is different from said first color, said printing in the second color being performed over said printed information in the first color;

detecting whether any of the information printed in the first color is exposed after performance of the printing in the second color, by acting on the information printed in the first and second colors; and determining that improper printing has occurred when it is detected that any of the information printed in the first color is exposed and that proper printing has occurred when it is detected that none of the information printed in the first color is exposed.

2. The method according to claim 1, wherein said desired information comprises numbers.

3. The method according to claim 2, wherein said printing of the numbers comprises sequentially printing different numbers in numerical sequence on each of a plurality of documents.

4. The method according to claim 1, wherein said desired information is printed in the same font and size as the information printed in said first color.

5. The method according to claim 1, wherein the sensing means comprises a photosensitive light sensing means which transmits light on the information printed in the first and second colors and receives the light reflected by said information.

6. A print verification apparatus, comprising:

supply means for supplying a document having desired complete information printed thereon in a first color; and verification means for verifying that said printed information in said first color has been properly printed, said verification means including:

printing means for printing desired information on the document in a second color, which is different from said first color, said second printing means printing the desired information over the information printed in said first color;

sensing means for sensing from the information printed in the first and second colors whether said information printed in said first color is exposed after said printing means prints said desired information in the second color; and determining means for determining that said information in said first color is improperly printed when said sensing means senses exposure of said information printed in said first color and that said information in said first color is properly printed when said sensing means senses no exposure of said information printed in said first color.

7. The apparatus according to claim 6, wherein said printing means prints different numbers in a sequential manner in numerical sequence on each of a plurality of documents.

8. The apparatus according to claim 7, wherein said printing means prints the numbers in the same font and size as the information printed in said first color.

9. The apparatus according to claim 6, wherein said sensing means comprises a photosensitive light sensing means which transmits light to the information printed in the first and second colors and receives the light reflected by said information.

10. The apparatus according to claim 6, wherein said determining means comprises an indicator which provides one of a visual and an audible indication when exposure is sensed.

11. A print verification apparatus, comprising:

supply means for supplying each of a plurality of documents having desired complete numbers printed thereon, said numbers being printed in a first color; and verification means for verifying that said printed numbers in said first color have been properly printed, said verification means including:

printing means for printing numbers on each of said plurality of documents, said printing means printing said numbers in a second color which is different from said first color over the numbers printed in said first color;

sensing means for sensing from the numbers printed in the first and second colors whether at least a portion of any number printed in said first color is exposed after said printing means prints said numbers in the second color; and determining means for determining that said numbers printed in said first color are improperly printed when said sensing means sense exposure of at least a portion of the numbers and that said numbers printed in said first color are properly printed when said sensing means senses no exposure of said numbers printed in said first color.

12. The apparatus according to claim 11, wherein said printing means prints numbers in the same font and size as the numbers printed in said first color.

13. The apparatus according to claim 11, wherein said sensing means comprises a photosensitive light sensing means which transmits light to the numbers printed in the first and second colors and receives the light reflected by said numbers.

14. The apparatus according to claim 11, wherein said determining means comprises an indicator which provides one of a visual and an audible indication when exposure is sensed.

* * * * *